United States Patent [19]
Astiz et al.

[11] Patent Number: 6,035,330
[45] Date of Patent: Mar. 7, 2000

[54] WORLD WIDE WEB NAVIGATIONAL MAPPING SYSTEM AND METHOD

[75] Inventors: Paul Astiz, North Bethesda, Md.; Fil Feit, Annandale; Wai-Tim B. Chau, Chantilly, both of Va.

[73] Assignee: British Telecommunications, London, United Kingdom

[21] Appl. No.: 08/622,856

[22] Filed: Mar. 29, 1996

[51] Int. Cl.[7] ............................. G06F 17/30; G06F 13/00
[52] U.S. Cl. ...................... 709/218; 709/200; 709/203; 709/213; 709/217; 707/102; 707/514; 345/356; 345/357
[58] Field of Search ..................................... 395/200, 500, 395/200.48, 200.51, 200.53, 200.57, 200.59, 200.3–200.36, 200.43–200.49; 340/990–995, 910; 342/350; 345/348–349, 355–357, 427–428, 434–440; 709/200–206, 213–219, 227–229; 707/9–10, 102, 513–514

[56] References Cited

U.S. PATENT DOCUMENTS

| | | | |
|---|---|---|---|
| 4,996,645 | 2/1991 | Schneyderberg Van Der Zon . | 701/200 |
| 5,019,828 | 5/1991 | Schoolman | 342/457 |
| 5,530,852 | 6/1996 | Meske, Jr. et al. | 709/205 |
| 5,543,789 | 8/1996 | Behr et al. | 340/995 |
| 5,555,354 | 9/1996 | Strasnick et al. | 345/427 |
| 5,572,643 | 11/1996 | Judson | 709/218 |
| 5,592,172 | 1/1997 | Bailey et al. | 342/350 |
| 5,615,325 | 3/1997 | Peden | 345/326 |
| 5,625,781 | 4/1997 | Cline et al. | 709/217 |
| 5,644,740 | 7/1997 | Kiuchi | 345/357 |
| 5,659,729 | 8/1997 | Nielsen | 707/3 |
| 5,694,546 | 12/1997 | Reisman | 709/217 |
| 5,754,939 | 5/1998 | Herz et al. | 709/219 |
| 5,802,299 | 9/1998 | Logan et al. | 709/218 |
| 5,822,539 | 10/1998 | Van Hoff | 709/235 |
| 5,937,163 | 10/1998 | Lee et al. | 709/218 |

FOREIGN PATENT DOCUMENTS

| | | | |
|---|---|---|---|
| 0 457 445 | 11/1991 | European Pat. Off. | G06F 15/72 |
| 93/10495 | 5/1993 | WIPO | G06F 11/32 |

OTHER PUBLICATIONS

GeoScience and remote sensing, vol. 2, 1994, pp. 863–865 Nigel Hinds and R. W. England (IEEE) "An Experimental Mosaic Interface to Scientific Information Systems".

"A Trip to Hawaii with CyberPilot™ Pro", described on the World Wide Web at URL=http://www.netcarta.com/, Mar. 11, 1995.

*Computer Networks International Journal of Distribution Informatique*, vol. 27, No. 6, Apr. 1996, Amsterdam, Netherlands, pp. 1075–1087, XP000579907, S. Mukherjea et al., "Visualizing the World–Wide Web with the Navigational View Builder".

*Primary Examiner*—Zarni Maung
*Assistant Examiner*—Bharat Barot
*Attorney, Agent, or Firm*—Nixon & Vanderhye P.C.

[57] ABSTRACT

An Internet navigational mapping system and method provides a user, browsing through various informational resources provided at various World Wide Web site locations supported by the Internet, with a graphical representation of the structure of the web site to permit the user to navigate through the web site efficiently using that structure. That structure can be thought of as a navigational map which represents objects in a web site and links to/from those objects in a hierarchical tree structure. The map could be represented in two-dimensional, three-dimensional, or a virtual reality format. The map therefore provides the user with an easy to read, graphical image of where the user is a web site and where he may go. A web site mapping mechanism is provided which parses the various objects contained in the web site and organizes those objects and links between the objects into an organized, and preferably, hierarchical, fashion. Virtually any object found in a web site such as web pages, graphics, audio clips, animation, etc. may be mapped.

35 Claims, 8 Drawing Sheets

ND METHOD

WORLD WIDE WEB NAVIGATIONAL MAPPING SYSTEM AND METHOD

RELATED APPLICATIONS

This application is related to, commonly assigned U.S. patent application Ser. No. 08/624,224 (attorney docket no. 36-894), filed on Mar. 29, 1996, entitled "Hyperlin King Time-Based Data Files", now U.S. Pat. No. 5,918,012.

FIELD OF THE INVENTION

The present invention relates to data communications, and more particularly, to a method and apparatus for efficiently navigating information resources available over the World Wide Web.

BACKGROUND AND SUMMARY OF THE INVENTION

The Internet is a computer communications network built on worldwide data and telephone networks. Computers connected to the Internet can exchange information with any other connected computer. FIG. 1 is a simplified illustration of the "Internet Backbone." For example, the triangle in the center of FIG. 1 may represent the three major telephone conduits that exist between Washington, Los Angeles, and New York. The backbone is founded on various sets of major telephone conduits and switches that exist across the world. These communications conduits are designed to move large. Volumes of data traffic at high speed.

Each of the major conduits terminates at a router. The routers are large, fast switches that sort the large volumes of data for local routing, much as large post offices sort mail for local delivery. Each router is connected to additional, local routing devices. Some of the local routing devices, called "points of presence" ("POPs"), provide local Internet access. For example, an Internet termination router that exists in Washington may have point of presence routers connected in Baltimore, Alexandria, etc. A router can connect as many point of presence routers as the capacity of the switching systems and the Internet permit.

In addition to point of presence routers, commercial Internet exchanges (CIX in FIG. 1) and global Internet exchanges (GIX in FIG. 1) also connect to the routers. These exchanges transfer data between Internet service providers, both nationally and internationally. When data originates on one U.S. Internet service provider with a destination on another U.S. long distance provider, the data first routes to the commercial Internet exchange where it makes the transfer between providers. A similar situation occurs when data originates in one country bound for another country. The data first passes through the global Internet exchange where it is transferred from one provider to another. Additional local point of presence routers could connect off of the point of presence routers shown in FIG. 1. However, point of presence routers (POP1, POP2, POP3, etc.) usually provide a direct local connection point for various types of computers to connect to the Internet.

Personal computers of individual residential users typically connect to a local point of presence router through a local Internet carrier. As shown at POP2 in FIG. 1, a Local InterNet Carrier (LINC) obtains a direct line to the POP2, and then provides a modem or other connection via which a home computer user dials up for connection to the Internet. When the home computer connects to the modem of the local Internet carrier, the LINC switches the home computer to the POP2, which in turn connects it to the Internet.

Another method of connecting computers to the Internet is by direct connection through a local area network (LAN) to the point of presence. This example is shown as LAN#1 and LAN#2 connections to, respectively, POP1 and POP2. Specifically, the LAN#1 connects to the point of presence through a leased data line. The computers (PCs in FIG. 1) connected to the LAN receive and transmit data to the point of the presence through the LAN.

Also attached to the LAN are a variety of different servers, three of which are shown in FIG. 1. The File Server connects to the LAN and contains the common data files used by the PCs, LAN, and other Servers. An HTTP server is a particular type of server that processes incoming and outgoing data written according to a certain Internet communication protocol, called HyperText Transport Protocol HTTP). An electronic mail server processes e-mail data written to or eceived from the Internet.

As shown in FIG. 1, the Internet interconnects every computer on the Internet with every other computer on the Internet. An Internet site, such as LAN#1 for example, typically includes certain data files (called "web pages" which are a part of the World Wide Web or simply the "Web") in its file server. The Internet site HTTP server makes those pages available to other computers on the Internet. An HTTP Server that makes web pages available on the Internet usually includes a so-called "home page," which is the starting point for outside users to navigate through the underlying Web pages serviced by the HTTP Server. These Web pages are written in a special web language called HyperText Markup Language (HTML). When a user, such as the user of the "Home PC" (emanating from POP2 in FIG. 1), wants to view an Internet site's home page such as LAN#1's home page, it can do so by requesting that data from LAN#1 over the Internet. In response, LAN#1 retrieves the web page data from its File Server and instructs its HTTP Server to transmit the data, addressed to the Home PC, onto the Internet. The data travels from local leased link to the POP1, through the Internet via necessary routers, through POP2, through the local Internet carrier, and into the modem of the Hose PC. The request for the data from the Home PC to the LAN#1, of course, travels along the opposite path.

To insure that data is sent to and received by the appropriate receiver on the Internet, every "device" (e.g., workstation, PC, HTTP Server, File Server, etc.), communicating on the Internet is assigned a unique address called an Internet Protocol (IP) address. Elements of the IP address identify where in the network a device is connected. Other parts of the IP address identify the specific device. The IP address can be analogized to a phone number that can be called by another phone number to make a connection through a series of telephone switches. The phone number has an element (three digits) that identifies the state of the resident (i.e., the area code), an additional seven digits, three of which identify the local exchange of the resident, and four digits that specifically identify the home of the resident. The IP address is presently a thirty-two bit binary address, readily processed by computers, but cumbersome for use by human users. As a result, IP addresses are assigned mnemonics to make them more "user friendly." The mnemonic consists of two parts: a host name and a domain name. It is this mnemonic representation of the IP address which is commonly used by Internet users to access Web sites. Conventionally within the World Wide Web, the mnemonic "WWW" is used to represent the host name. The remaining portion of the mnemonic represents the domain or network where the host resides. For example, WWW.UCLA.EDU, identifies a host named "WWVW" in the domain (network) "UCLA.EDU."

FIG. 2 shows an address line written in the standard protocol used by Internet components to address each other and usually is used in the context of addressing a specific web page. The protocol is referred to as a "Uniform Resource Locator" (URL) and this terminology appears as the opening argument in the address of FIG. 2. In FIG. 2, the Uniform Resource Locator indicates that the request is for "http" formatted data, (i.e., a web page as opposed to, for example, an e-mail message). The home page for the data resides on the "zWWW" HTTP server on the "ucla.edu" LAN (or domain). The name of the file (to be found most likely in the file server supported by the ucla.edu LAN) is "homepage.html." If the ucla.edu LAN is LAN#1 of FIG. 1 and a PC user at LAN#2 wants to view the "homepage.html" file, the user sends the address shown in FIG. 2 to LAN#1 through the Internet channels shown in FIG. 1. Upon receipt of the address, LAN#1 returns to the user the "homepage.html" file over a reverse path through the Internet.

Once a user has received an "HTML" formatted file corresponding to a web page, the text of the displayed file may prompt the user to request additional information contained in different web page files. The prompts are referred to as "hypertext" and usually show up on a home page (or other web page) in a different color than normal text, thus distinguishing them as hypertext links. Hyperlinks may include any kind of hypertext or other hypermedia link from one HTML page to another HTML page in the current web site or in some external web site. Hypertext Markup Language is the computer language used to "compose" and represent information on a web page. As an example, a user requesting a local zoo home page may use several different hypertext links to files containing information on various animals at the zoo, a map of the zoo, operating times, etc. By clicking a mouse pointer on the hypertext, the user is automatically "transported" from a current web page to a new web page linked to that hypertext.

When the user clicks on a hypertext link, the user's data processor records the position of the computer pointer when the click occurred. The processor then uses a look-up table of x-y coordinates versus URLs to identify a new URL address assigned to the position of the computer pointer. The URL address may be serviced by the same domain or a different one, depending on the information contained in the look-up table. When the hypertext is selected, the browser requests a connection to the HTTP server hosting the file, and it also requests from the HTTP server the file identified by the URL. Once the HTTP server accepts the connection requested by the browser, the HTTP server proceeds to transmit back to the browser the requested file. Once the browser receives the requested file, it delivers or presents the content of the file to the requesting user.

The Internet provides a vast wealth of information. But the challenge is how to find a specific item of information hidden in that vast wealth. Anyone who has "surfed" the Internet knows that informational treasures can be found following some unusual routes leading to the discovery of the information. One of the most popular forms of surfing the Internet is the World Wide Web. In a sense, the Web is a client/server application that helps the user access various HTML pages available at various Internet sites. Its function is to display documents and to make links between items of information available. The user then chooses which links to follow as the user pursues a course through various Web pages. An Internet web site or simply web site refers to an entity connected to the Internet which supports Web communications and/or web files. A typical web site will include an HTTP server and one or more HTML pages (sometimes referred to as web pages).

A Web browsing session is similar in some respects to rummaging around in a flea market or a badly organized library. There is no doubt that you will discover much more than you realized, but there is some doubt whether you will find what was originally sought. On the one hand then, Web browsing is an enjoyable activity; on the other hand, Web browsing can be frustrating because it is difficult to easily target and go directly to a particular informational resource.

Hypertext links in a document allow a reader to jump from one object to another object within the document and to objects outside of the document. As a result, reading becomes a series of jumps to non-sequential points in the text rather than line by line of text. Hyperlinks between documents create an informational space with no formal pathways. A user browses starting from one HTML web page and simply explores from there. Consequently, no two paths through the web are likely to be the same. But the ability to know what informational resources are available and go directly to the specific information needed is lacking.

In fact, when browsing the Web, it is easy to become lost in the maze of hyperlinks. A hyperlink jump may take the reader up or down any number of levels or just as easily to another web server anywhere in the world. When entering a new web page, the user finds himself at a location chosen by the author of the previous web page. For example, consider a user viewing the "WOMBAT" home page. The user points to an article about wombats on an on-line magazine. After reading the article, the user then returns to the original WOMBAT home page without realizing that the magazine also included an article on wallabies, a subject in which the user also happens to be interested. Alternatively, the link may be to the magazine's home page rather than directly to the Wombat article. The user must then sift through a series of listings until he finds the issue having the Wombat article.

FIG. 3 shows a very simple example of how a web site is configured including a home page and a plurality of Hypertext Markup Language (HTML) pages each of which may contain one or more hyperlinks. FIG. 3 shows only a few hyperlinks between various ones of the HTML pages. As a user clicks on one hyperlink in the home page, he is transported to one of the three HTML pages in the first branch or tier. Page 1 may have for example a hyperlink which returns the user to the home page or a hyperlink which forwards the user to Page 4 or 5. Page 4 has a return link to the home page while Page 5 has a return link to Page 2. Even with this extremely simple example showing only one or two hyperlinks per page for just a few pages, it is apparent that a user can quickly get lost in the maze of HTML pages accessible through the HTTP server of that web site. This maze is complicated and enlarged when a hyperlink takes the user to another HTTP server at another web site which could theoretically be anywhere else in the world.

What is needed is a quick way to identify the various types of information available at an Internet web site having web pages without actually having to go to that site or browse through its HTML pages. It would also be desirable to traverse through various web pages at one or more sites without having to tediously "click" multiple times the browser "BACK" and/or "FORWARD" buttons. Instead, it would be very helpful to have a graphical representation or map of one (or more) Internet web sites that reveals the structure and content of the Internet web sites so the user knows what information is provided on each page and what web pages are linked to other web pages.

It is an object of the present invention to provide a web user with a 2-dimensional, 3-dimensional, "virtual reality," or other graphical representation of the structure of one or more web sites to permit a user to navigate through the web site efficiently using the structure.

It is a further object of the present invention to permit a user to represent objects in a web site and links to/from those objects in a hierarchical tree structure for display.

It is a further object of the present invention to provide the user with a map which provides the user with an easy to read, graphical image of where the user is in a web site and where he may go, e.g., at which HTML page the user is currently located and the links to other HTML pages supported by the HTTP server at that site.

It is a further object of the present invention to provide a Web user a map which through graphical symbols and/or text provide information about the content, size, estimated time to download the page, date last updated, whether the page has changed since the user last visited the site, and other information which would make it easier for the user to grasp the nature of the Web site and thus make decisions as to where to go on the Web site.

It is a further object of the present invention to provide a web site mapping mechanism which parses the various objects contained in a web site and organizes those objects and links between those objects into an organized fashion (e.g., a hierarchical structure).

The present invention solves these problems and meets these and other objects with an Internet navigational mapping system. In essence, the navigational map gives a user in a condensed graphic image the structure and clues to the content of one or more web sites that allows the user to navigate through the web site using that structure. At a basic level, the map represents how various objects at a web site are linked to other objects. Any object found at a Web site such as web pages, graphics, audio clips, animation, etc. may be mapped.

Therefore, the Web navigational map in accordance with the present invention is much like a road map. Instead of having to drive from Washington, D.C. to New York over various interstates, highways, and secondary roads following only signs along those roadways which indicating that you are heading towards New York, the map allows the user to view the map (without even getting in his car) to determine beforehand the most efficient and direct road route to New York as well as to check out various other options in which the user may be interested. For example, in viewing the map the driver may decide that it is important first to stop off in Philadelphia before travelling on New York. If the driver had simply followed the road signs on the interstates, there may not have been signs on the roads actually being driven by this driver pointing to Philadelphia. Accordingly, the present invention allows the user to visualize paths through one or more web sites to various destinations without having to actually follow/explore those paths to know that they exist and where they lead.

The Web navigational mapping system has two central components: a map maker and a map viewer. The map maker generates a navigational map of objects and links present at a web site. The map maker arranges the various hyperlinks between objects in the web site in an easy to read, hierarchical fashion, and in the preferred example embodiment, this hierarchy resembles a tree. Each branch of the tree provides textual and graphical information which describes the content of the web object the branch represents. The text describes the substantive content of the object. One or more icons relate to various characteristics of the object including the type of object, (e.g., an HTML file), an in-line picture, an external link, the size of the file, etc. Both the text and icons help the user know what information is available at the web site and visualize where the user is and where he may go in the site.

The web site navigational map is stored in a map database and can be loaded locally or downloaded by a network browser such as NETSCAPE™. The map viewer retrieves the web site map from the database and displays the map. The user then has a clear picture of what is in the site, where objects are located, and how objects are interlinked. The user also has a graphical structure that shows the user where he is in the site and where he may go. The user may jump to any site object directly simply by selecting the corresponding map entry. Using this displayed hierarchical representation of the web site, the user knows in advance the content of a web page. In other words, the user does not have to actually travel through that web site unless it contains something the user wants to see.

BRIEF DESCRIPTION OF THE DRAWINGS

These and other objects and features of the present invention will be described in further detail in conjunction with the following drawings in which like reference numerals refer to like elements in which.

DETAILED DESCRIPTION OF THE INVENTION

Figure 1:
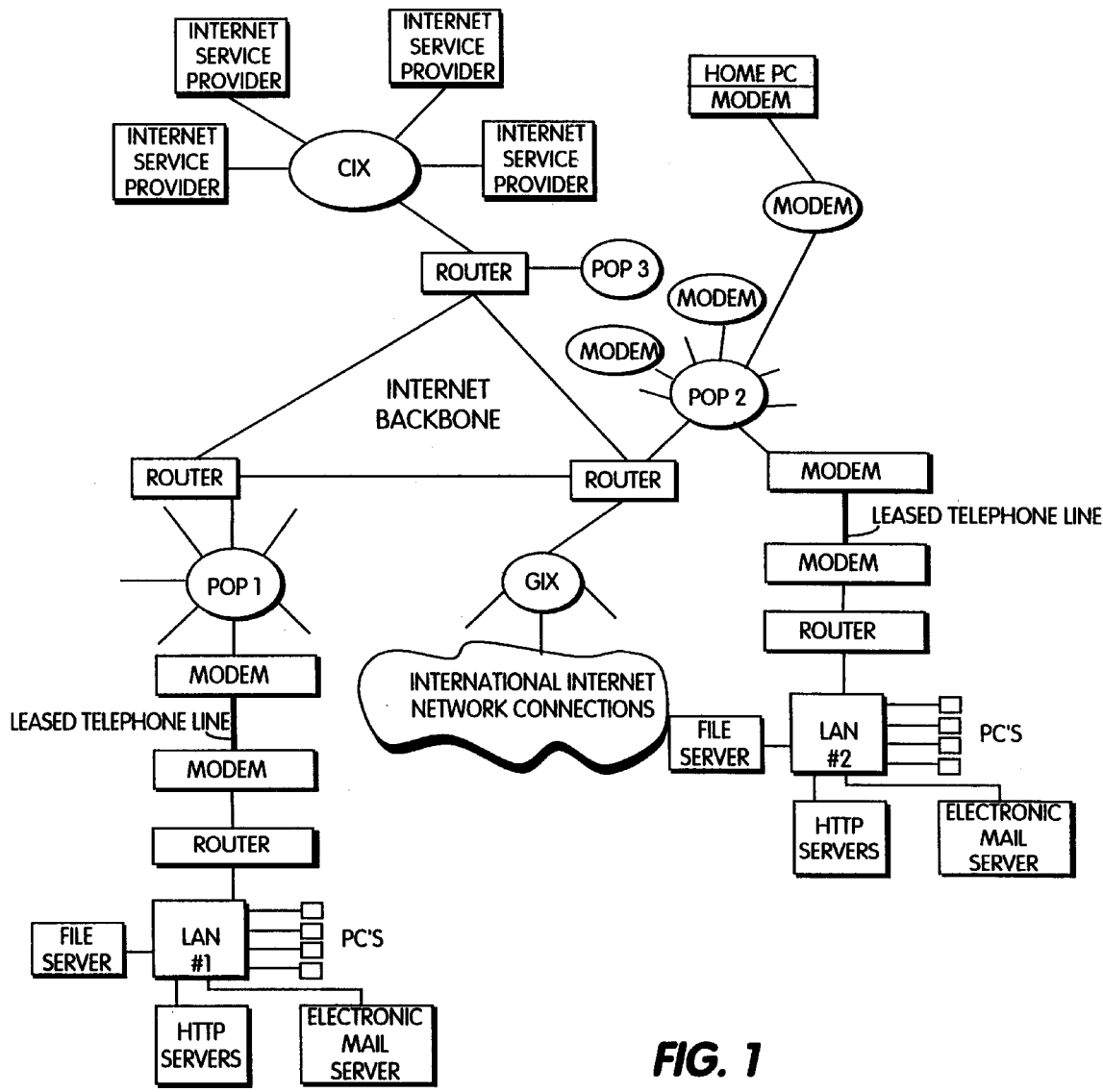
FIG. 1 is a diagram showing the Internet with various routers, points of presence, and sites.
Figure 2:
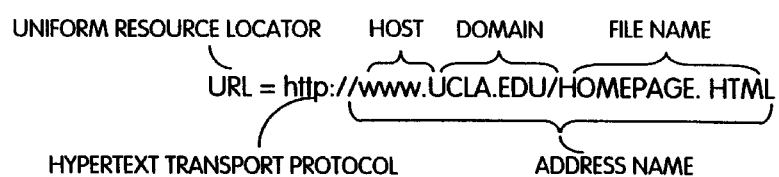
FIG. 2 illustrates components of a uniform resource locator (URL), which is part of the mechanism used to locate various informational resources on the World Wide Web.
Figure 3:
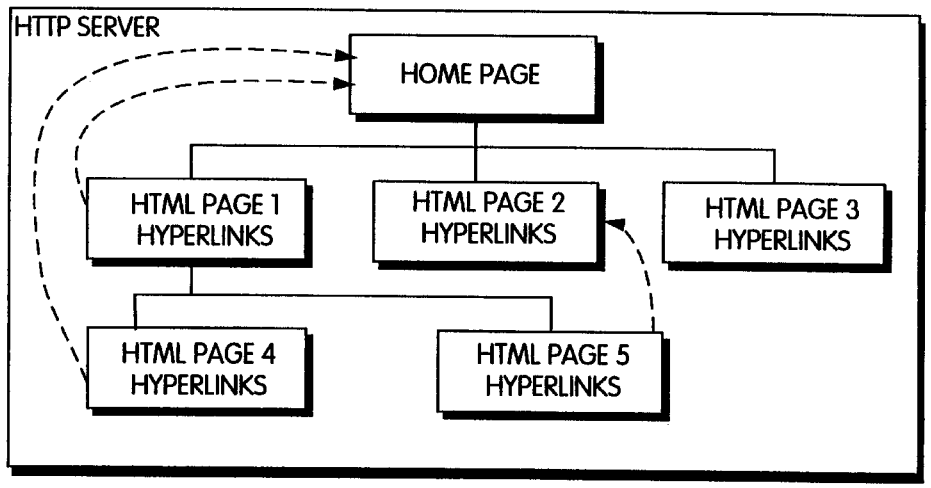
FIG. 3 is a function block diagram of a web site having an HTTP server hosting a home page and a number of HTML web pages.

For purposes of explanation and not limitation, specific details are set forth such as specific software engines, software interfaces, display features, and control procedures in order to provide a thorough understanding of the present invention. However, it will be apparent to one skilled in the art that the present invention may be practiced in other embodiments that depart from these specific details. In other instances, detailed descriptions of well known methods, hardware devices, network protocols, operating system platforms, etc. are omitted so as not to obscure the description of the present invention with unnecessary detail.

An Internet World Wide Web navigational mapping system 10 is shown in the function block diagram in accordance with an example embodiment of the present invention. It should be understood that the present invention may be applied to any Web application on any type of network including public networks such as the Internet and private networks such as a network accessible only by a certain company's employees, etc. Thus, for example, both Internet web sites and Intra-Nets web sites can be effectively navigated using the present invention. Reference to the Internet throughout the description therefore is meant only as a convenient, non-limiting example of a network that supports a Web application.

The Web navigational mapping system 10 operates using a work station and/or a PC-based data processing engine and operating platform 20. This data processing platform contains conventional data processing hardware (e.g., CPU, memory, communications, drivers and interfaces, etc.), software (e.g., operating, communications, and applications programs, etc.), and user interface including a keyboard, mouse, display monitor, etc. The navigational mapping system 10 is implemented on this platform 20 using various software structures including computer programs and one or more databases.

A central software structure is the Internet browser 12 which is a software program that establishes a connection from the user's computer to a web site so that it can request and receive data (e.g., HTML web pages) over the Internet. The browser 12 also interprets HTML data and presents it to the user on the display screen using text and graphics formats most readily understood by the user. In addition, the browser uses other "helper" software structures to interpret and/or present HTML information to the user as described in further detail below in conjunction with FIG. 8. One commercially available browser is provided by NETSCAPE. Browser 12 connects over the Internet represented generally as block 22 to various web sites 24a, 24b, 24c, . . . 24n on the Internet. Browser 12 interfaces with a map viewer 18.

The map maker 14 analyzes the files at a web site supported by the site's HTTP server. A typical example of such a file is an HTML web page. Based on that analysis, the map maker 14 creates a map of the web site which, in a preferred example embodiment, is configured as a hierarchical, tree-type data structure. The hierarchical map data structure identifies each HTML page at the web site, the links between those pages, and various characteristics of each HTML page. Although the present description usually refers to a single web site being mapped by the map maker 14, those skilled in the art will appreciate that multiple web sites may be advantageously mapped by map maker 14 such that multiple site maps are stored in map database 16. This allows a user to efficiently navigate through multiple sites—a feature which is particularly desirable in the usual case where hyperlinks connect HTML pages located at different web sites. It should also be appreciated that the map maker 14 could be implemented at a workstation or PC operated separate from a user who is using one or more site maps to navigate the Web. However, in this example embodiment, both the map maker 14 and map viewer 18 are used at a single work station/PC to allow a user to both create and view web site maps as desired—a convenient and powerful tool for the user.

Figure 5:
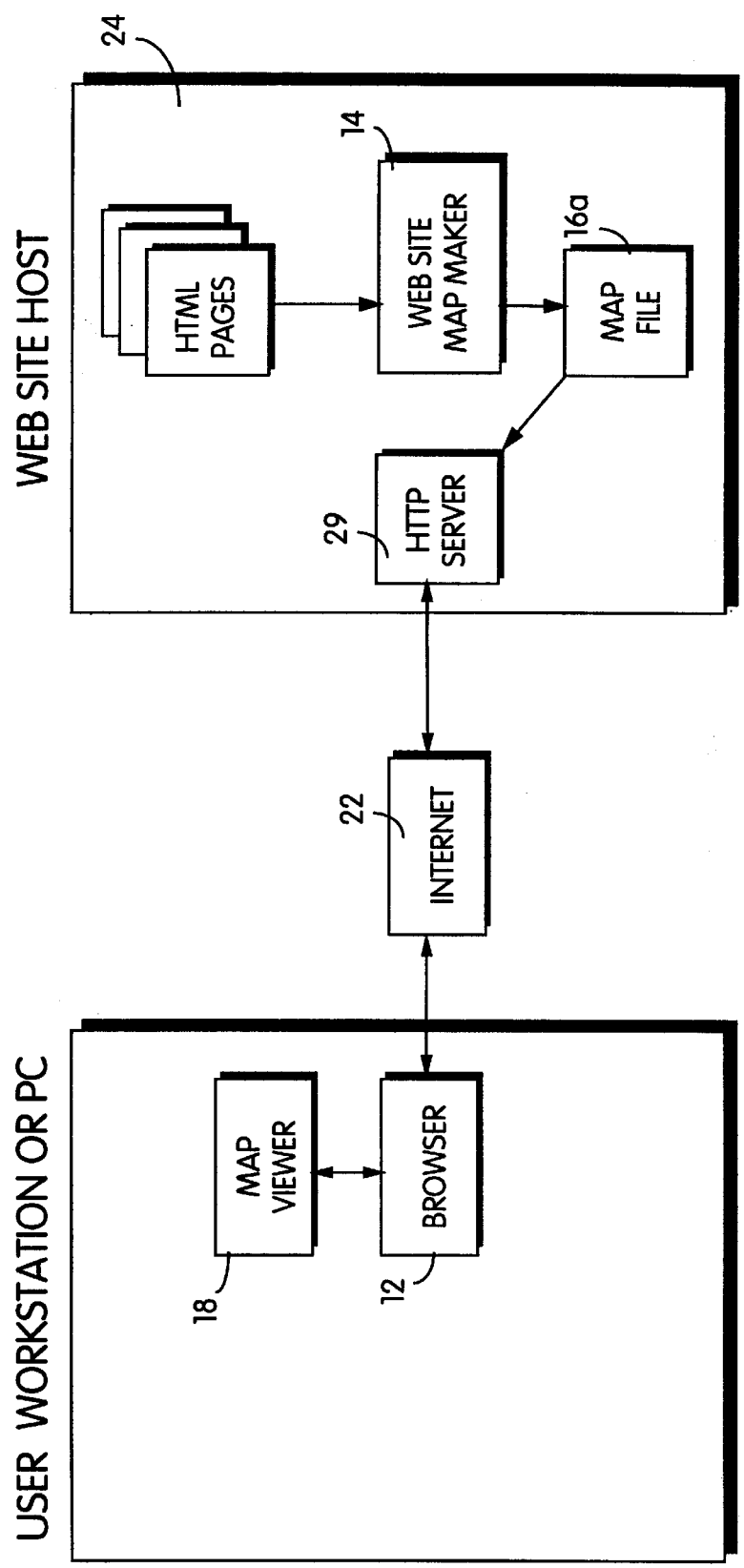
FIG. 5 is a function block diagram showing a Web navigational system in accordance with another example embodiment of the present invention.

On the other hand, in an alternative example embodiment, a Web site administrator could use the Map Maker to generate a map of the Web site and store the map locally on the Web site. FIG. 5 depicts such an implementation. An icon on the home page of the Web site 24 would alert a Web site visitor/user that a locally generated Web site map exists. By clicking on the icon, the map is transferred by HTTP server 29 from map file 16a to the Web visitor's workstation via the Internet 22 and is presented by map viewer 18 to the user. The user uses the map to navigate through the Web site 24. An advantage of this implementation is that the Web site administrator, who has intimate knowledge of the structure and content of this Web site, can customize the map using customization features provided by the map maker and thus produce a better and more useful map. Some of the customization features include, but are not necessarily limited to annotations on the map or map entries, use of different graphical symbols to represent content, different color of map entries, an altered icon legend, removed map entries, other information created by the map maker, etc.

This example implementation offers significant cost and performance advantages over one in which each user accessing the Web site is mapping the site. From the user's point of view, the site map already exists. The user therefore does not have to wait for his workstation or PC to generate the map—a lengthy process if the Web site is large and the user's access connection speed is low (residential Internet access connections are generally low speed). Additionally, the user must be connected to the Internet Service provider while the site is being mapped and therefore incurs connection costs. From the point of view of the Web site owner, if each user that accesses his Web site generates a map, the Web site server must transmit larger volumes of data to the user's workstation than the server normally would transmit within a shorter period of time. Effectively, the entire Web site would have to be transmitted. Since the map maker on the user workstation can process the information much faster than a user browsing through the site, there would be a significantly larger number of requests for files placed on the Web host over a shorter span of time. This would significantly degrade the performance of the server and affect the overall quality of the service.

For these non-limiting, example implementations, each entry in the Web site map is linked to the named file. While the detailed description often assumes that the file is usually an HTML type of file for illustration and ease of description, the present invention is not limited to HTML file types and accommodates different file types, If the file is not an HTML or similar type file, an appropriate browser viewer is invoked by the browser 12 for GIF, PS, AU, etc. files; for links to GOPHER://, mailto://; etc.

The map data structure might include for each file entry in the map the following items which are to be understood only as non-limiting examples:

| Item Number | Field Name | Field Description |
|---|---|---|
| 1 | Reference Number | A number that uniquely identifies this entry |
| 2 | Link Type | Gopher, HTTP, Mail to, etc. |
| 3 | Location | Relative path to this URL |
| 4 | File Name | Actual file name with an extension, i.e., URL = link type://location/file name |
| 5 | File Type | Extension of file name |
| 6 | Last Modified | Date and time that the file was last modified |
| 7 | Size | Size of this file in bytes |
| 8 | Title | Title of this file, if any |
| 9 | Characteristics Flags | Indicate the file is an in-line picture, an ISMAP, an action, a top level link, passworded, etc. |
| 10 | Link Geography | Internal or external link. If it is a link to another server, it is flagged as external. This field may also be used to determine if there are links without a valid target. |
| 11 | Include | This flag is set or cleared based on an inclusion decision in the map maker file. |
| 12 | Hierarchical level | A value which represents the hierarchical level of a map entry within the map structure. |

Of course, many other items could be included in the database format.

Once a site map data structure is created by the map maker 14, it is stored in a map database memory 16 for access by browser 12 via map viewer 18. Once a web site is mapped, the map maker 14 generates a map icon which is automatically displayed by the browser 12 whenever the user is browsing that web site. A user displays the web site map by clicking for example on that map icon displayed on the browser display screen. The browser 12 then checks the map database 16 to retrieve and display the web site map using the map viewer 18. If there is no map for this web site, the map viewer 18 requests the map maker 14 to create a corresponding site map and store it in the map database 16. After the map is created for this site, that map is displayed by the map viewer 18.

Figure 6:
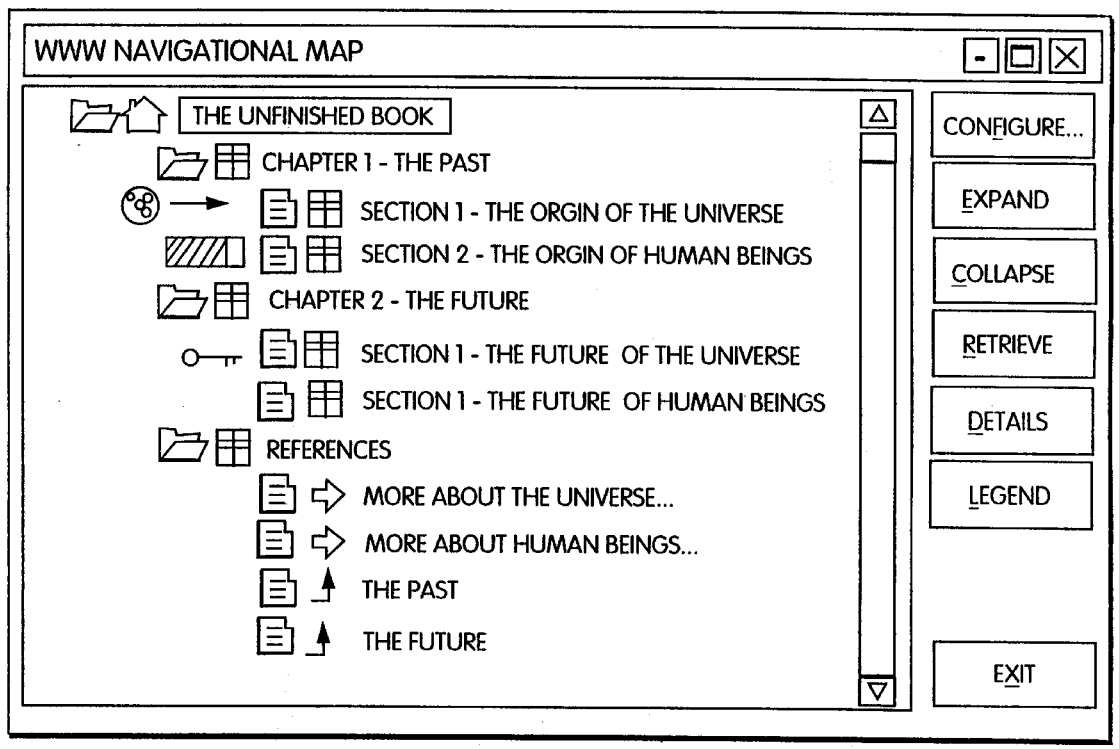
FIG. 6 is a very simple example of a web site map.

As a very simple example, reference is now made to a navigational map shown in FIG. 6 illustrating a web site which has a home page entitled "The Unfinished Book." The navigational map in this simple example is structured like a table of contents or outline "tree." Of course, other tree-type or other hierarchical structures may be employed. A parent-child model could also be used to describe the hierarchical structure of the map. Three main branches Chapter 1, Chapter 2, and References originate from the tree trunk "The Unfinished Book." Each main branch has two or more sub-branches or "leaves." Each entry in the hierarchy includes descriptive text and/or icons to help the user understand the content of each entry in the map. The hierarchical structure of the map shows existing hyperlinks between pages. The map may be represented in two dimensions, three dimensions, or in a "virtual reality" environment.

Figure 7:
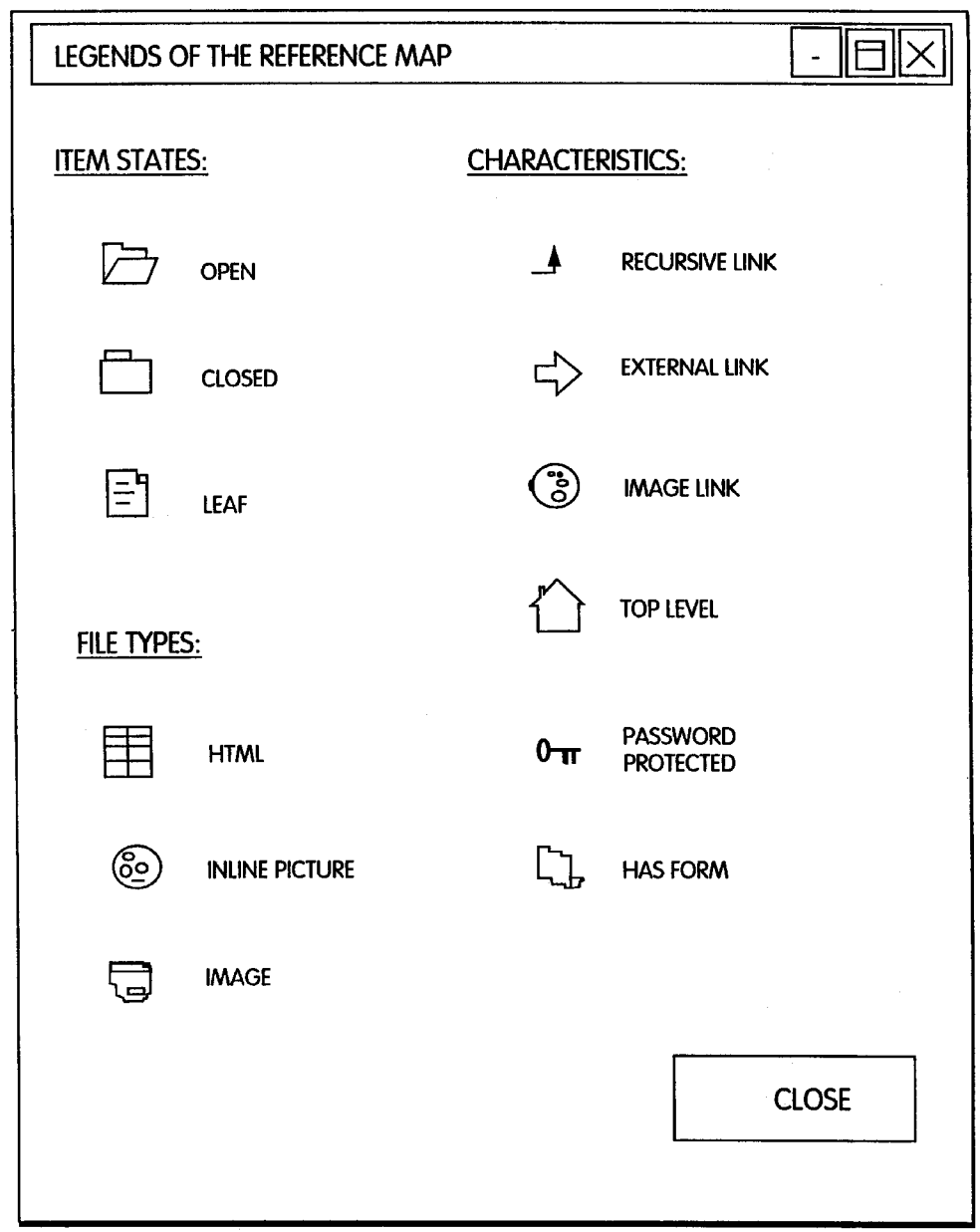
FIG. 7 illustrates various example legends of icons which may be used in the creating a web site map.

Examples of various icons which might be used to convey characteristics about individual map entries are shown in the legend illustrated in FIG. 7. For example, the entry "The Unfinished Book" is indicated as the home page using the top level icon.

The user may view the map by itself, in conjunction with other maps, or as a window overlay to the browser display. In the latter situation where the map is displayed as a window which overlays the browser display, as the user explores various HTML pages, the user sees at the same time exactly where he is in the web site map. The open folder icon indicates that all branches and links in this web site are included in the map. Alternatively, one of the features of the present invention is exclusion of certain types of information including certain branches, certain types of files, redundant links, directories that should not be released to the general public, and certain links which require external viewers or might clutter up the map. While these links may be included in the map data structure file, they may be selectively disabled for a less cluttered map unless the user requests display of the full map.

The Chapter 1 tree entry is linked to the home page and includes an icon indicating that the file type is a HTML page. Its content is revealed by the brief text description "The Past." Two HTML pages titled Section 1 and Section 2 are linked to "The Past" page and can be thought of as "leaves" on the Chapter 1 branch. The Section 1 "leaf" includes an image link icon indicating that there is an image hyperlink in the Section 1 HTML file. Chapter 2, Section 1 is a password protected file and requires entry of the correct password for access to the web page entitled "Future of the Universe." Accordingly, a security key icon is provided next to this entry.

While many of the links are to other HTML pages in the web site, the References HTML page includes two external links—"More About the Universe . . . " and "More About Human Beings . . . " The existence of these external links is indicated by a horizontal arrow icon. The other "The Past" and "The Future" entries have recursive links that branch back to other previous objects in the web site. Accordingly, a recursive link arrow icon is attached to this entry. Another helpful icon is the horizontal bar which provides the user with an indication of the HTML page file size. If it is a large file, the user may decide not to explore that file because of the time it might take. In addition, one of the map icons may indicate that a link is unavailable or unreachable when the map was made. This could be for a number of reasons such as for example the remote receiver was down, too busy, or the link to that particular page is broken. Still another icon could be used to indicate if or when the map or a map entry was modified.

To go directly to a map entry such as an HTML page, the user simply selects a map entry, e.g., clicks his mouse while pointing to one of the entries in the displayed navigational web site map. In response, the map viewer 18 and browser 12 retrieve the specified HTML page.

If the user selects an external hyperlink which is connected to another web site, the user may decide to view a web site map of that additional site either as the new map window or as a separate but simultaneously displayed map window superimposed on part of the browser display. If a map for this new web site is not stored in the map database 16, the user is preferably prompted to indicate whether he wants the map maker 14 to create a map in real time for that web site. With each new web site map stored in the map database 16, increasing numbers of web site maps are available for even more extensive navigation through the Web. By viewing one or more maps, the user never loses track of his frame of reference because the larger context of the HTML page currently being viewed is provided. As the user moves through the Web, the currently viewed HTML page in the map is highlighted which also provides the user with an immediate frame of reference. Moreover, instead of clicking browser "BACK" or "FORWARD" display buttons many, many times to flip between web pages, the user simply clicks directly on the desired entry in the map and is transported to the corresponding web page.

Figure 8:
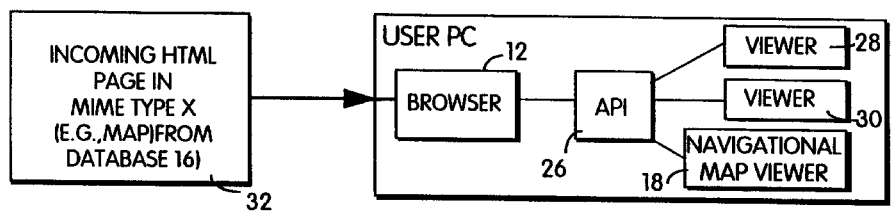
FIG. 8 is a function block diagram showing how an Internet browser on a user PC interprets incoming HTML pages over the Internet and employs when necessary various "helping" viewers to analyze and display information from that incoming HTML page.

As described above, there are certain functions for which the browser 12 relies on other "helper" software packages to perform commonly referred to as "viewers." Reference is made to FIG. 8 which shows a number of viewers 28 and 30, along with the map viewer 18, connected to the browser 12 via an application programming interface (API) 26. The API 26 permits the browser 12 to communicate with these external software viewers. Because the map viewer 18 is a new viewer, it requires a new Multi-purpose Internet Mail Extension type (MIME). To draw an analogy to human language, each MIME type identifies a particular language. If the file is in Japanese, it has a specific MIME type which indicates that the file is written in Japanese. The browser 12 detects the MIME type of the current file and uses the appropriate viewer to translate the language of the file into a language understood by the browser 12. Thus, when the map maker 14 creates a web site map, it also creates a map MIME type. When a user requests display of a site map from database 16, an incoming HTML page 32 in a MIME type is received and recognized by the browser 12". At this recognition, the browser 12 invokes the map viewer 18 to display the web site map.

Figure 4:
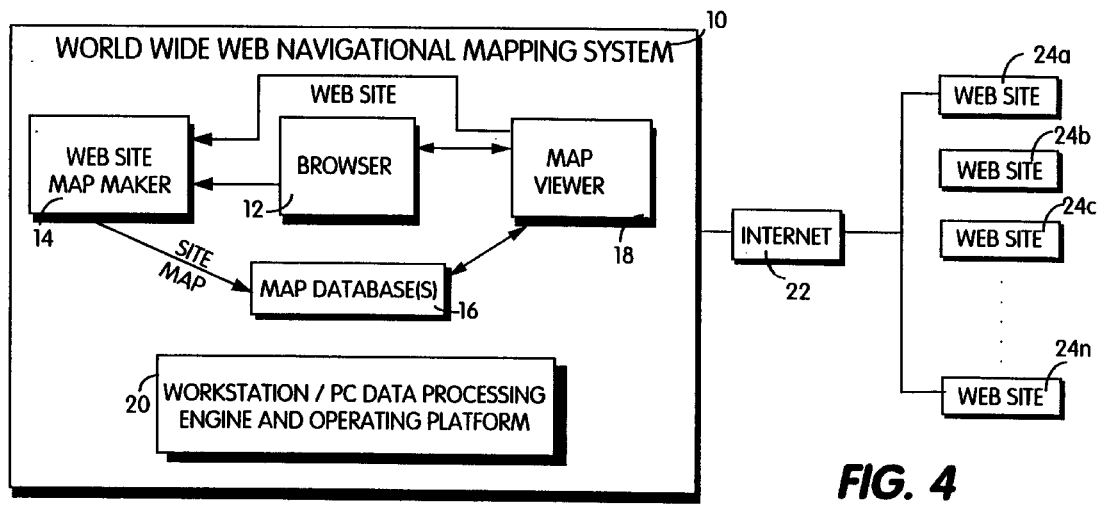
FIG. 4 is a function block diagram showing a Web navigational system in accordance with one example embodiment of the present invention.
Figure 9:
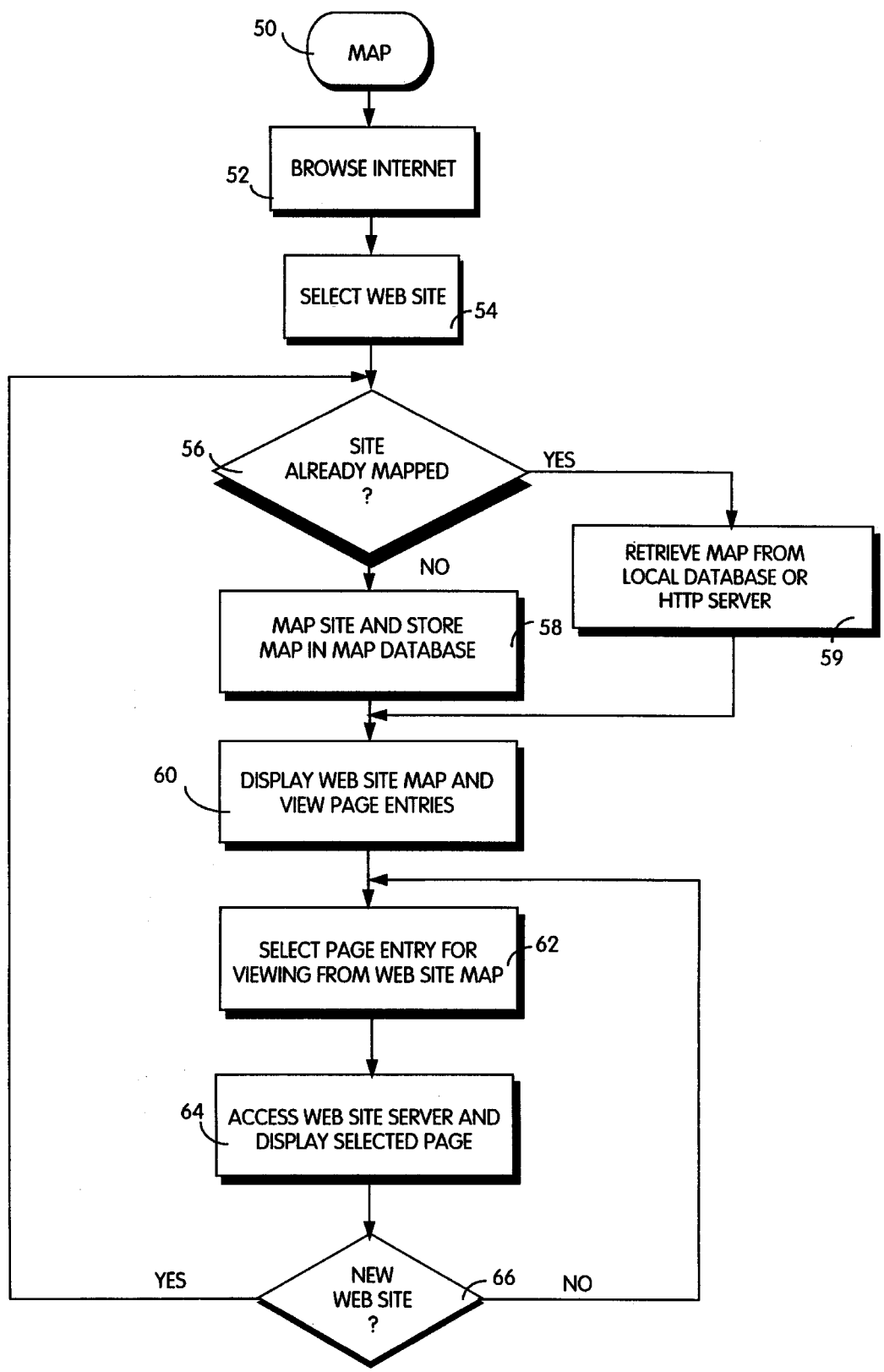
FIG. 9 is a flowchart diagram illustrating basic map creation and map viewing procedures followed in accordance with the example embodiment of the present invention.

The overall process for generating and viewing Internet navigational map(s) is now described in conjunction with the MAP (block 50) flowchart shown in FIG. 9. Initially, a user may be browsing the Internet using browser 12 (block 52). In the course of browsing, a user may select a web site for viewing/exploring (block 54). A decision is made then whether this web site has already been mapped (block 56). If so, the Web site map is retrieved from the local map database (FIG. 4) or the site HTTP server (FIG. 5) (block 59). If not and if the user decides to map the site, the browser 12 invokes the map maker 14 to generate a map for this web site, and the generated map is stored in the map database 16 (block 58). The web site map is then displayed using the map viewer 18 (block 60). The user studies the various map entries and selects one of the entries for viewing (block 62). By selecting a particular page entry (for example by double clicking on that page entry in the web site map), the browser 12 uses the URL corresponding to that selected page entry to access the corresponding web site server, retrieve the selected page, and display it (block 64). A decision is made whether a new web site is being accessed (block 66). If so, control returns to decision block 56 to determine whether this site has already been mapped. Otherwise, control returns to block 62 to detect when a user has selected another entry from the web site map.

The above description assumes that the navigational map is created and viewed while browsing the web. In addition, the user may view one or more existing navigational maps without connecting to the Internet simply by retrieving those one or more navigational maps from database 16 and displaying them. This approach allows the user to select a web site before actually accessing the Internet thereby saving access time and money.

Figure 10:
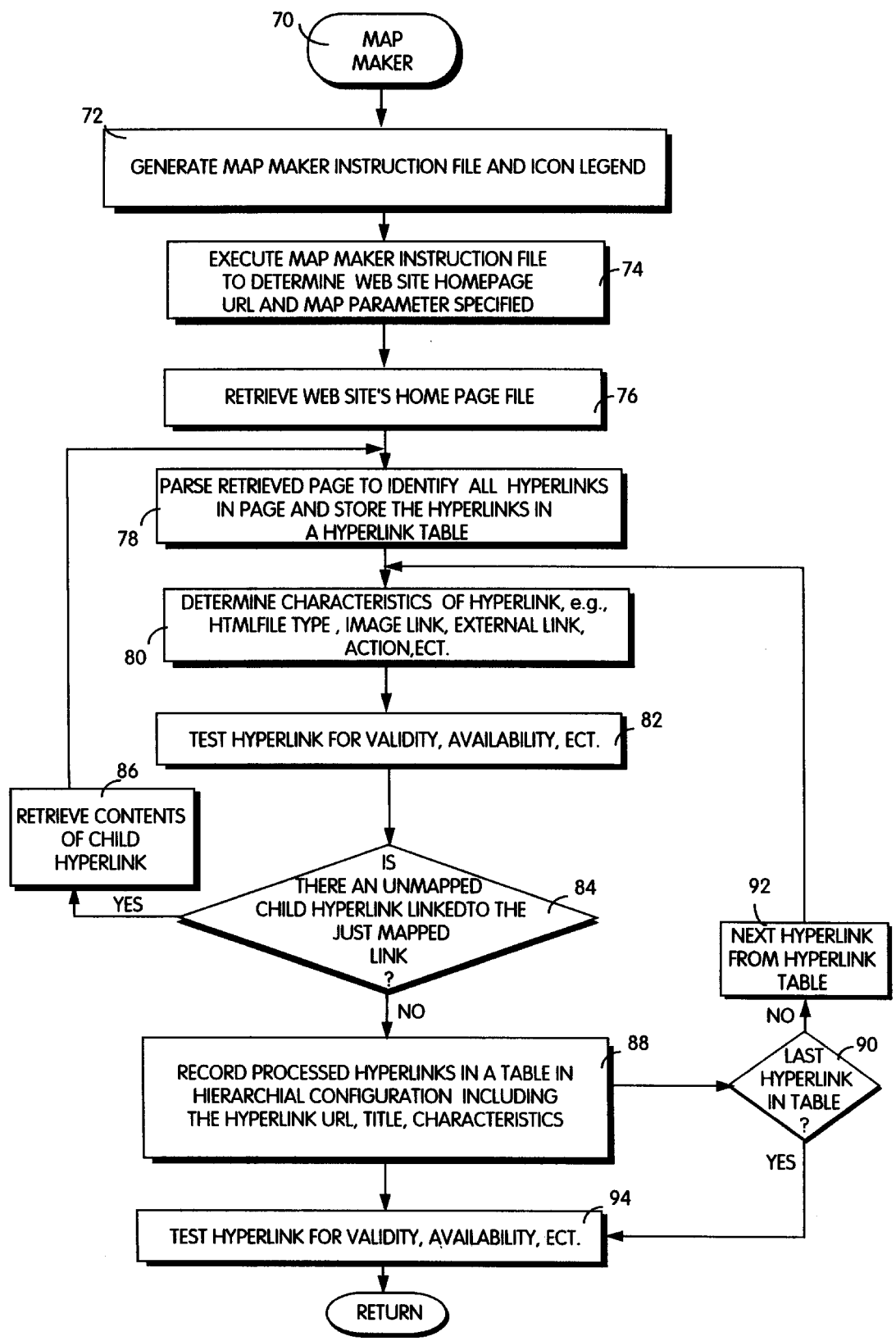
FIG. 10 is a flowchart diagram of the exemplary steps performed in creating one or more web site maps in accordance with the example embodiment of the present invention.

Specific but nonetheless example procedures which may be followed in generating a web site map are now described in conjunction with a MAP MAKER algorithm (block 70) illustrated in FIG. 10. Initially, a map maker instruction file and icon legend (such as the legend shown in FIG. 7) are created. It is in this process that the basic decisions are made about which of the available fields provided in the map database will be included and which tree entry characteristic icons will be used in the map and map legend (block 72).

The map maker instruction file is executed to determine the home page URL of the web site being mapped and the various map parameters specified (block 74). Using the web site URL, the map maker 14 retrieves via the browser 12 the web site's HTML home page file (block 76). The retrieved HTML page is parsed by the map maker to identify all hyperlinks in the page, and those hyperlinks are stored in a hyperlink table (block 78). The various characteristics of each hyperlink in the hyperlink table are also determined to fill in the appropriate fields for this hyperlink database entry as shown for example in the table above (block 80). Each hyperlink is tested for validity/availability (block 82). If a link is not accessible/available, a broken link flag is set for the corresponding entry.

A decision is made whether there is an unmapped "child" linked to the just mapped link (block 84). Or using the tree metaphor, is there another hyperlink embedded in the currently mapped hyperlink requiring another branch entry of the hierarchical tree? If so, the contents of that child hyperlink HTML page are retrieved (block 86), parsed, and stored in the hyperlink table (block 78). This process continues until there are no unmapped hyperlink children, or until the mapper reaches map boundary parameters specified in the map maker. For example, the user could specify that the mapping should not go beyond those pages that are part of the Web site, or the mapping should not go beyond those pages that are outside the physical server where the Web site resides. Thereafter, the processed table entries are stored in hierarchical configuration including each hyperlinked URL, title, and characteristic (block 88). A decision is made in block 90 whether this is the last hyperlink in the hyperlink table. If not, the next hyperlink is retrieved from the table (block 92), and the procedures are repeated beginning with block 80. Otherwise, the web site map is generated in accordance with the hyperlink table (block 94) and stored in the map database 16.

Figure 11:
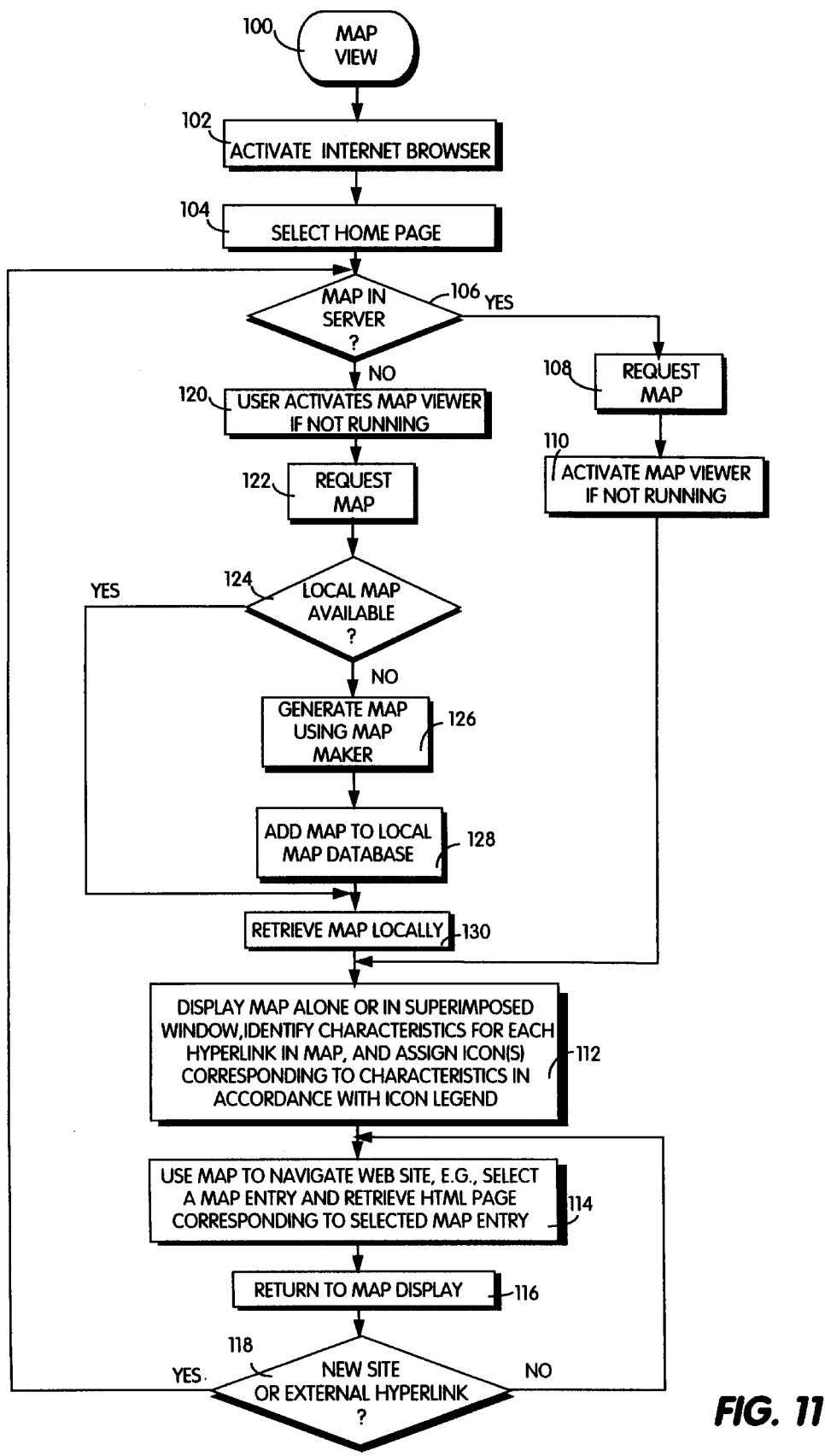
FIG. 11 is a flowchart diagram illustrating various steps is performed in viewing one or more site maps to permit a user to navigate efficiently and effectively through that web site.

Example procedures performed by the map viewer 18 to display and update display of a web site map in accordance with the example embodiment of the present invention are now described in accordance with the example embodiment of the present invention using the MAP VIEW (block 100) procedures illustrated in the flowchart of FIG. 11. If the user activates the web browser (102), the user can select a home page of a mapped web site (block 104). Once that home page of the web site is retrieved, the user can retrieve the map by selecting the hyperlink pointing to the web site map if available (block 106). At this point, the map viewer 18 will be activated if not already running, and it receives the map from the browser (block 110). Alternatively, the user can activate the map viewer 18 if it is not running (block 120) and request the map via the map viewer 18 (block 122). If the map is not available locally (block 124), map maker 14 generates the site map (block 126), and the map will be stored locally (block 128) for local retrieval (block 130).

Once a navigational map is retrieved, the map viewer 18 identifies the characteristics for each hyperlink in the map and assigns one or more of various icons corresponding to those characteristics for each map entry in accordance with the stored icon legend. The site map is displayed either alone or superimposed in the browser display as a window (block 112). The user then studies the map and uses it to navigate through the web site.

Once a desired map entry such as an HTML page is identified, the user selects that HTML page by pointing to the entry in the map and clicking with the mouse. The browser 12 then retrieves the HTML page corresponding to the selected map entry using the URL corresponding to that map entry. As described above, as the user browses through various HTML pages, the map entry corresponding to the current HTML page being browsed is highlighted in the map so that when the user returns to the map (block 116), the user knows exactly where he is in the web site.

A decision is made in block 118 whether a new site or an external hyperlink has been accessed. If not, the user returns to site navigation (block 114). Otherwise, the new site or the site corresponding to the external hyperlink is interrogated to determine whether that site has already been mapped (block 106). While navigating by using map viewer 18 (block 114), the user can choose the exit option to terminate the map viewer 18.

With the present invention, the user can explore various Internet web sites much faster using the hierarchical map display of the various web sites which is much faster than traditional "browsing" of the web. Instead of blindly crawling through a web site not knowing where the user is going and sifting through web pages in which the user is not interested or are too large and therefore would take too long to download to the user's workstation, the user easily views all of the pages and other objects at the web site, selects the page/object desired directly from the map, and is immediately transported to the corresponding web page. The user saves access time and money because less time is wasted blindly traversing the web.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for navigating a plurality of computer-implemented sites accessible on a communications network, each site providing access to files stored at that site, at least some of the files including one or more hypermedia links to other files, comprising:

a browset accessing the files at the plurality of sites and displaying accessed files to a user;

a computer-implemented map maker parsing the files at one of the computer-implemented sites to identify hypermedia links in the files, organizing the parsed information, and generating a map data file based on the parsed and organized information that represents in structural, outline format files available at the one computer-implemented site to identify hypermedia links in the files;

a computer-implemented map database for storing the map data file; and a computer-implemented map viewer, in response to a request from the browser to display the map data file, retrieving the map data file from the map database and displaying a map of the one computer-implemented site corresponding to the map data file, the site map graphically illustrating in the structural outline format the structure and content of the files available at the one computer-implemented site and the hypermedia links between those files, wherein the user uses the displayed site map to navigate the one computer-implemented site.

2. The system in claim 1, wherein some of the computer-implemented sites correspond to remotely-located computer sites that communicate over a network and wherein the map maker generates a corresponding site map for each of plural remotely-located computer sites and stores those corresponding site maps in the map database.

3. The system in claim 2, wherein when the browser accesses a new site, the map viewer retrieves and displays the map corresponding to the new remotely-located computer site.

4. The system in claim 1, wherein each of the computer-implemented sites are web sites that include a file server for providing access to files at the web site upon request, and wherein the map generated for the web site illustrates in the structural, outline format the files at the web site and the one or more hypermedia links between the files.

5. The system in claim 1, wherein entries of the map include text or graphic symbols or both to convey information about the site.

6. The system in claim 1, wherein the map is displayed in a portion of a user display, and as the user accesses different files at the computer-implemented site, the map viewer indicates on the site map a current location of the user in the site corresponding to the currently accessed file at the site.

7. The system in claim 1, wherein the map maker is located at a corresponding one of the plurality of computer-implemented sites and generates a map for its corresponding site and stores that map at the corresponding site.

8. The system in claim 7, wherein the map viewer is provided at a computer terminal connected to a communications network, the one site is remotely located from the computer terminal, and the map viewer retrieves the map stored at the one site over the communications network.

9. The system in claim 8, wherein the one site corresponds to a site file server and the computer terminal requests files from the site file server over the communications network.

10. The system in claim 1, wherein the map maker, map database, and map viewer are implemented by a computer connected to a communications network being used by the user.

11. A method for generating a hierarchical representation of informational objects available from one of a plurality of web sites, some of which are remotely-located from each other, each object including a file capable of being displayed and some of the objects including at least one hypermedia link to another file, comprising the steps of:

retrieving at another of the plurality of web sites at least some of the web site display files available at the one web site;

automatically parsing the retrieved web site display files to determine the identity of at least some of the web site display files and hypermedia link relationships between the web site display files; and automatically organizing the parsed web site display files into a hierarchical representation of the parsed web site display files that identifies each web site display file and shows the hypermedia link relationships between the web site display files.

12. The method in claim 11, further comprising the step of:

specifying boundaries of the map to indicate where to stop the mapping process.

13. The method in claim 11, further comprising the step of:

annotating an entry in the map to provide additional information.

14. The method in claim 11, wherein another web site retrieves the display files from the one web site over the communications network.

15. The method in claim 11, further comprising the step of:

determining whether each of the identified hyperlinks is available or valid, and indicating in the hierarchical representation if one of the identified hyperlinks is unavailable or invalid.

16. The method in claim 11, further comprising the step of:

determining a plurality of characteristics relating to each display file, and representing each of the characteristics in the hierarchical representation as a graphical symbol.

17. The method in claim 16, wherein objects correspond to data files and the characteristics include any one or more of the following:

file type, file size, whether the file includes video, image, or audio related data, whether any one of the relationships is to a file at another one of the data processors, when the hierarchical representation was most recently modified, or what characteristics are to be excluded from the hierarchical representation.

18. The method in claim 11, further comprising the step:

specifying which of the parsed display files are to be included in the hierarchical representation.

19. A data structure stored in a memory and retrievable from the memory for display on a display connected to a first data processor that communicates with other remotely-located data processors over a network, wherein the data structure includes a structured outline of at least some of page data files available at one of the other remotely-located data processors coupled to the communications network accessible by the first data processor and of links between some of the display page data files, each page data file being capable of display and including at least one hypermedia link to another file, and wherein the structured outline of at least some of the display page data files and associated hypermedia links available at the one remotely-located data processor is displayed and used to navigate through the display page data files at the one data processor.

20. The data structure in claim 19, wherein the display files correspond to HTML pages and the structured outline includes hypertext links between the HTML pages.

21. Software usable by a computer to assist a user in navigating through web sites on the World Wide Web over the Internet which when executed by the computer performs the method of:

organizing a collection of files and associated hyperlinks at one of the web sites into an outline;

based on the organized collection, generating a map data file for the one web site that represents in outline form the files available at the one web site and associated hyperlinks to a computer user having a computer coupled to the Internet including entries in the map outline for web page files and associated hyperlinks available at the one web site; and displaying at the user's computer a map outline corresponding to the map data file for the one web site that graphically represents the outline structure of files available at the one web site and associated hyperlinks; and navigating the one web site using the map outline including accessing one of the files at the one web site by selecting one of the outlined files from the displayed map outline.

22. The method in claim 21, wherein the map outline includes text identifying each file included as an entry in the map and links between entries.

23. The method in claim 22, wherein the map outline includes one or more icons or other graphical symbols associated with characteristics of at least some of the map entries, each icon or graphical symbol conveying information about the map entry.

24. The method in claim 23, wherein the characteristics include any one or more of the following:

file type, file size, date the file was last updated, estimated time to download, whether the file includes video, image, or audio related data, whether any one of the relationships is to a file at another one of the data processors, when the hierarchical representation was most recently modified, or what characteristics are to be excluded from the hierarchical representation.

25. The method in claim 21, wherein the map outline is a hierarchical outline of the files which identifies each resource and linking relationships between the files.

26. The method in claim 25, wherein the linking relationships include external links to files at another of the web sites, and wherein when the user pursues an external link, the method further comprises the steps of:

generating a map data file for the another web site that represents in outline form files available to the computer user, and displaying at the user's computer a map corresponding to the map data file for the another web site.

27. The method in claim 26, further comprising the step of:

accessing one of the files at the another web site using the displayed map as a navigational aid.

28. The method in claim 27, wherein the maps corresponding to the one and the another web site are displayed at the user's computer at the same time.

29. The method in claim 21, wherein each web site includes an HTTP file server for serving a number of HTML page files corresponding to ones of the files.

30. In a system for navigating informational resources provided at a plurality of computer-implemented sites accessible on a communications network where for one of the computer-implemented sites a map data file is generated which outlines some of the files and associated hyperlinks available at the one computer-implemented site, a viewing engine for use at a user computer terminal connected to the communications network for retrieving the map data file for the one computer-implemented site, displaying a map corresponding to the map data file showing at least some of the files available at the one computer-implemented site, and permitting the user to navigate through files available at the one computer-implemented site to a desired one of the files using the displayed map, wherein the map is a hierarchical, tree-like representation of at least some of the files and associated hyperlinks available at the one site including a branch for each file.

31. The viewing engine in claim 30, wherein the user is transported by the viewing engine directly to one of the available files at the one site by selecting one of the branches from the map.

32. The viewing engine in claim 30, wherein the map is superimposed on the display as the user views a selected one of the files, and wherein the viewing engine tracks the progress by the user through various ones of the files and indicates on the map the current branch of the map at which the user is located.

33. The viewing engine in claim 30, wherein the map includes text identifying such file includes as an entry in the map.

34. The viewing engine in claim 33, wherein the map includes one or more icons associated with characteristics of at least some of the map entries, each icon conveying information about the map entry.

35. The viewing engine in claim 34, wherein the map entries correspond to data files and the characteristics include any one or more of the following: file type, file size, date file last updated, whether the file includes video, image, or audio related data, whether any one of the relationships is to a file at another one of the data processors, when the hierarchical representation was most recently modified, or what characteristics are to be excluded from the hierarchical representation.

* * * * *